UNITED STATES PATENT OFFICE.

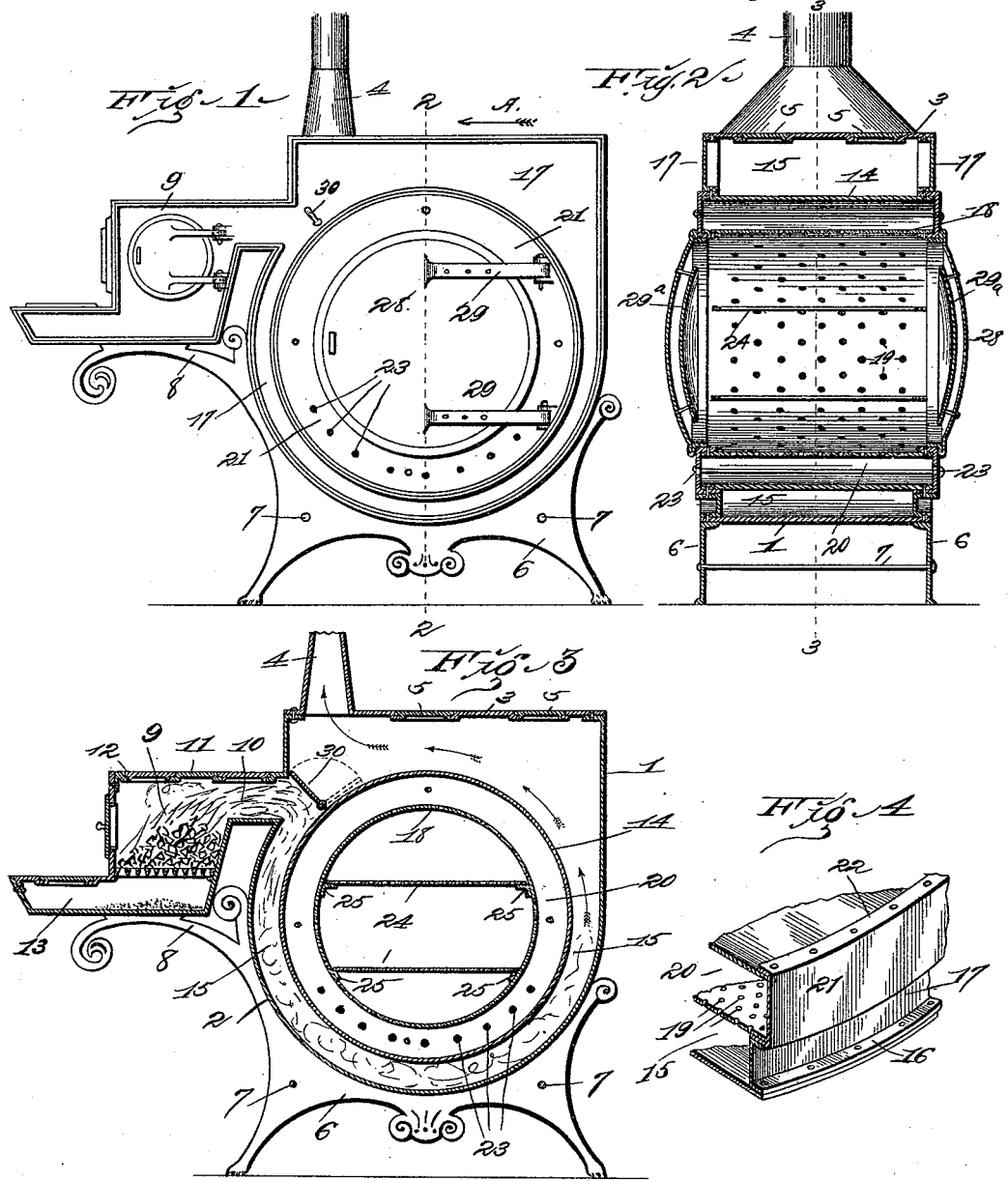

ROBERT McDANIEL SMITH, OF LOUISIANA, MISSOURI, ASSIGNOR OF ONE-HALF TO GEORGE HARVEY, OF SAME PLACE.

STOVE.

SPECIFICATION forming part of Letters Patent No. 538,469, dated April 30, 1895.

Application filed January 2, 1895. Serial No. 533,536. (No model.)

*To all whom it may concern:*

Be it known that I, ROBERT MCDANIEL SMITH, of the city of Louisiana, Pike county, State of Missouri, have invented certain new and useful Improvements in Stoves, of which the following is a full, clear, and exact description, reference being had to the accompanying drawings, forming a part hereof.

My invention relates to an improved cooking stove or range, and consists in the novel construction, combination and arrangement of parts, hereinafter described and claimed.

The object of my invention is to provide an improved cooking stove, which shall possess superior advantages in point of cheapness, simplicity, durability and general efficiency, and to construct the oven of said stove so that the air will be heated before going into the oven, and so that the heated air may pass into the oven equally from opposite points, whether said points be top and bottom or opposite sides, whereby the oven will be an even baker and several tiers of bread, pies or cakes may be baked uniformly upon top and bottom without being interchanged.

In the drawings, Figure 1 is a side elevation of a stove constructed in accordance with my invention. Fig. 2 is a vertical sectional view taken approximately on the indicated line 2 2 of Fig. 1 and looking in the direction as indicated by the arrow A. Fig. 3 is a longitudinal sectional view taken approximately on the indicated line 3 3 of Fig. 2. Fig. 4 is a detail view, in perspective, showing a portion of the construction of my improved stove.

Referring by numerals to the accompanying drawings, 1 indicates the main casing of my improved stove, the same being constructed with a circular bottom 2 and flat top 3, near the front side of which is an outlet 4. In the flat top 3 of the casing is located a series of ordinary stove-holes closed by removable lids 5.

The casing 1 is supported upon suitable standards or legs 6, the same being held together by transverse rods 7.

Located upon arms 8 that extend forward from the supporting legs 6 is the fire-box 9, the same being of ordinary construction and communicating with the interior of the casing 1 through a passage 10 formed between said fire-box and casing 1.

The top plate 11 of the fire-box 9 is constructed with the usual openings covered by the ordinary stove-lids 12, and beneath the fire-box 9 is an ash-pan 13.

Located within the casing 1 and concentric with the circular contour of the same is a circular drum 14 which is imperforate, and thus a passage or flue 15 is formed between the casing 1 and the circular drum 14 to conduct the flame, smoke and products of combustion from the fire-box 9 entirely around the drum 14 to the outlet or smoke pipe 4. This drum 14 is securely held in position by being riveted or fixed in any suitable manner to the flanged edges 16 of the sides 17 of the casing 1, said sides 17 being formed to fit the contour of the casing 1.

Arranged concentrically within the circular drum 14 is a drum 18, the same being provided with perforations 19, which surround the oven-space and permit ready passage of the heat evenly to all parts of the interior of the oven. This perforated drum 18 which forms the oven of my improved stove being somewhat smaller in diameter than is the drum 14, therefore a hot air passage 20 is formed around the entire surface of the perforated drum 18. Said air passage 20 is closed at the ends, and the drum 18 is held in proper position by face-rings 21, the same being constructed with the flanged edges 22, whereby they are riveted or securely fixed to the edges of the drums 14 and 18. These face-rings are more securely held in position by transverse rods 26 passing through the hot air passage 20. Semi-circular rows of perforations 23 are formed in the lower halves of these face-rings 21, and serve to admit fresh air into the hot air passage 20.

A plurality of racks 24 are horizontally positioned within the oven, said racks resting upon brackets 25 fixed to the interior of said oven. The ends of the oven are closed by circular doors 28, the same being swung upon hinges 29 fixed to the face-rings 21. The doors 28 are provided with circular concaved disks 29$^a$ on their inner faces, thus really forming double ends for said oven.

A damper 30 is pivoted transversely in the passage 15 immediately in the rear of the passage 10. When a fire is first lighted in the fire-box 9, to produce a direct draft from said fire-box to the exit pipe 4, the damper 30 is thrown to the position shown by dotted lines in Fig. 3 and the smoke, flame and products of combustion pass directly from the fire-box 9 through the passage 10 and into the pipe 4. The damper is also thus positioned when it is desired to use the stove openings directly over the fire-box and closed by the lids 12. When it is desired to use the oven or locate cooking utensils upon the top 3 and within the stove openings therein, the damper is positioned as shown by solid lines in Fig. 3, thus deflecting the flame, smoke and products of combustion through the passage 15 between the main casing 1 and the circular drum 14, which, as hereinbefore stated, extends entirely around said drum 14. As the drum 14 becomes heated the air within the passage 20 between the drum 14 and the perforated drum 18 forming the oven will necessarily become heated and freely circulate through the perforations 19 in the drum 18, and whatever food is located in the usual manner upon the racks 24 within said oven will be very thoroughly and efficiently baked, upon top and bottom, sides and ends almost evenly. As previously stated, the fresh air is admitted to the hot air space 20 through the apertures 23 in the face-rings 21.

By means of the above described construction the air is heated before going into the oven and passes into the oven equally from opposite points, whether such points be the top and bottom or opposite sides, thereby permitting the oven to bake evenly, top, bottom and sides alike, so that several tiers of bread, pies or cakes placed upon the several racks within the oven will be baked uniformly without being moved or interchanged, each tier being browned alike on top and bottom.

The entire casing of the stove and the drums located therein may be constructed of ordinary sheet metal, or said parts may be cast and either bolted or riveted together as desired.

A stove of this construction presents a neat and finished appearance, is simple in operation, inexpensive in the cost of manufacture, and by being provided with the circular drums a direct passage entirely around the oven is formed thereby enlarging the heating and cooking capacities of the stove.

By my improved construction the oven drum 18 is easily removed by simply loosening the transverse rods 26.

What I claim is—

A stove, comprising a casing having a semi-circularly formed lower portion, a fire-box constructed at one side of the casing and communicating with the interior thereof, an exit pipe from the top of the casing adjacent the fire-box, a damper positioned within the casing between the fire-box and the exit pipe, an imperforate drum concentrically located within the semi-circular portion of the casing, a perforate drum concentrically located within the imperforate drum, racks located within the perforate drum, and face-rings closing the ends of the passage between the imperforate and the perforate drums, said face-rings being constructed with a series of apertures adapted to admit air to said passage.

In testimony whereof I affix my signature in presence of two witnesses.

ROBERT McDANIEL SMITH.

Witnesses:
ALONZO FRY,
J. M. NOEL.